US012293744B2

(12) United States Patent
Gong et al.

(10) Patent No.: US 12,293,744 B2
(45) Date of Patent: May 6, 2025

(54) HEAD JOINT FOR WIND INSTRUMENT, HAVING MOUTHPIECE AND REED PORTION FORMED THEREON, AND WIND INSTRUMENT COMPRISING SAME

(71) Applicants: Myeong-Kook Gong, Seongnam-si (KR); Da-Young Gong, Seongnam-si (KR)

(72) Inventors: Myeong-Kook Gong, Seongnam-si (KR); Da-Young Gong, Seongnam-si (KR)

( * ) Notice: Subject to any disclaimer, the term of this patent is extended or adjusted under 35 U.S.C. 154(b) by 105 days.

(21) Appl. No.: 17/916,532

(22) PCT Filed: Jan. 29, 2021

(86) PCT No.: PCT/KR2021/001253
§ 371 (c)(1),
(2) Date: Sep. 30, 2022

(87) PCT Pub. No.: WO2021/201406
PCT Pub. Date: Oct. 7, 2021

(65) Prior Publication Data

US 2023/0154441 A1 May 18, 2023

(30) Foreign Application Priority Data

Apr. 2, 2020 (KR) ........................ 10-2020-0040187

(51) Int. Cl.
*G10D 7/026* (2020.01)
*G10D 9/035* (2020.01)

(52) U.S. Cl.
CPC ............. *G10D 7/026* (2013.01); *G10D 9/035* (2020.02)

(58) Field of Classification Search
CPC .......... G10D 7/026; G10D 9/035; G10D 9/02; G10D 7/00; G10D 9/00
See application file for complete search history.

(56) References Cited

U.S. PATENT DOCUMENTS 4,970,931 A * 11/1990 Culbreath ................ G10D 9/02
84/384
5,027,685 A * 7/1991 Lenz ........................ G10D 9/08
84/385 P

FOREIGN PATENT DOCUMENTS

CN 201298344 Y 8/2009
CN 102760421 A 10/2012
(Continued)

OTHER PUBLICATIONS

International Search Report for PCT/KR2021/001253 dated Jun. 29, 2021, 4 pages.
(Continued)

*Primary Examiner* — Kimberly R Lockett
(74) *Attorney, Agent, or Firm* — Womble Bond Dickinson (US) LLP

(57) ABSTRACT

The present invention relates to a head joint for a wind instrument, having a mouthpiece and a reed portion, and a wind instrument comprising same and, more particularly, to a head joint for a wind instrument, having a mouthpiece and a reed portion, and a wind instrument comprising same, the head joint allowing for an extended range of one octave lower, i.e. extended lower notes, than the range of a two-side-open wind instrument by adding the range of a one-side-open wind instrument, which is played through a reed, to the range of a two-side-open wind instrument which only has a mouthpiece.

The head joint for a wind instrument, having a mouthpiece and a reed portion, according to the present invention has a tubular shape having one end closed, wherein the mouthpiece and the reed portion are formed, so as to be spaced apart from each other, at a certain distance from the end.

16 Claims, 8 Drawing Sheets

(56) References Cited

FOREIGN PATENT DOCUMENTS

| | | | | |
|---|---|---|---|---|
| CN | 104851417 | A | | 8/2015 |
| CN | 106251839 | A | | 12/2016 |
| CN | 206516340 | U | * | 9/2017 |
| JP | 50-120821 | A | | 9/1975 |
| JP | 2007-193100 | A | | 8/2007 |
| KR | 20-1988-0002180 | Y1 | | 6/1988 |
| KR | 20-0349305 | Y1 | | 5/2004 |
| KR | 20-0452251 | Y1 | | 2/2011 |
| KR | 10-1169605 | B1 | | 8/2012 |
| KR | 10-1379898 | B1 | | 4/2014 |

OTHER PUBLICATIONS

Extended European Search Report for Application No. EP 21780140.6, dated Aug. 22, 2023, 8 pages.

Notice of Reasons for Refusal for Application No. JP 2022-560464, dated Oct. 10, 2023, 2 pages, and English translation 5 pages.

* cited by examiner

[FIG. 1A]
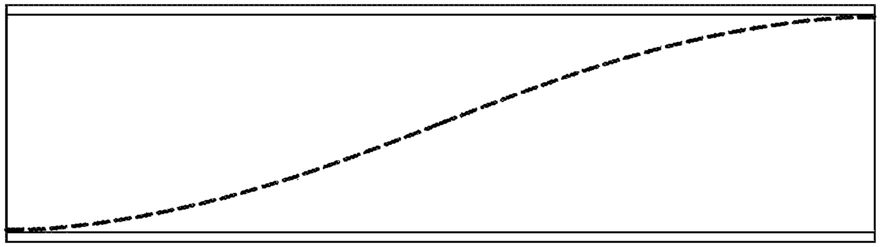

[FIG. 1B]
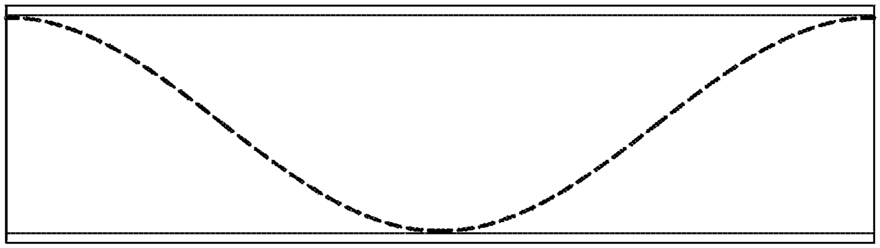

[FIG. 2A]
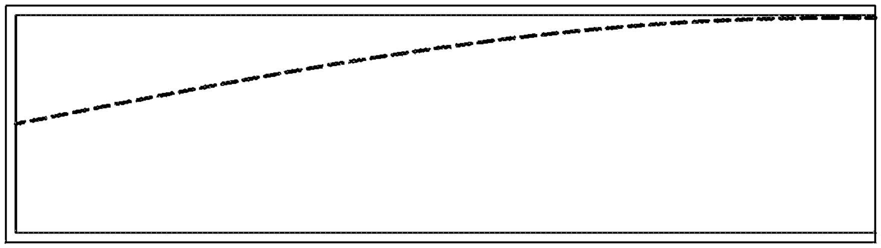
[FIG. 2B]
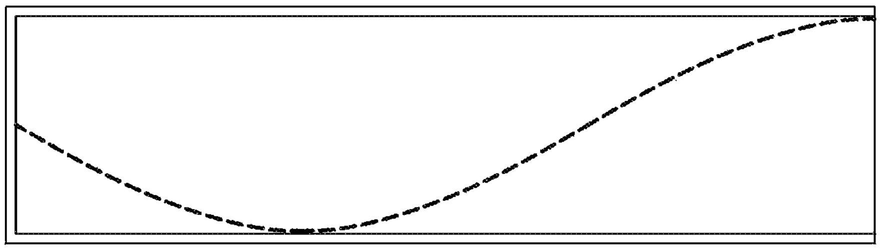

[FIG. 3]
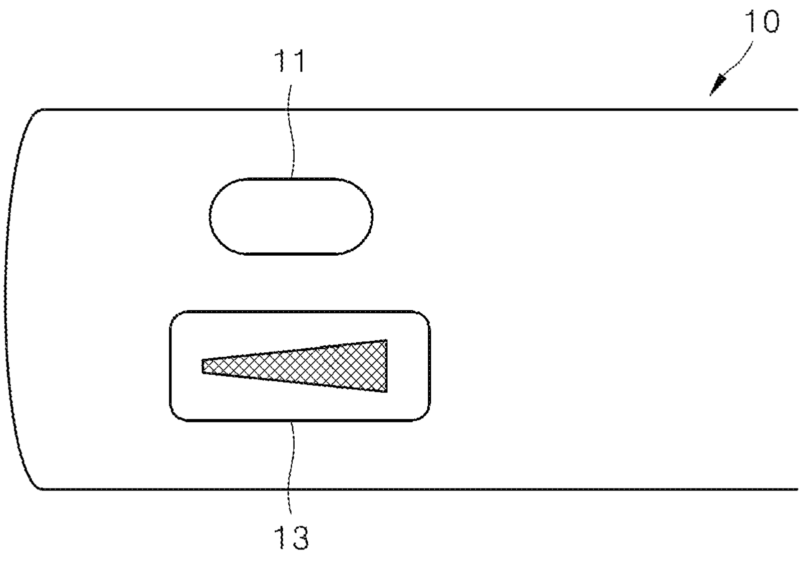

[FIG. 4A]
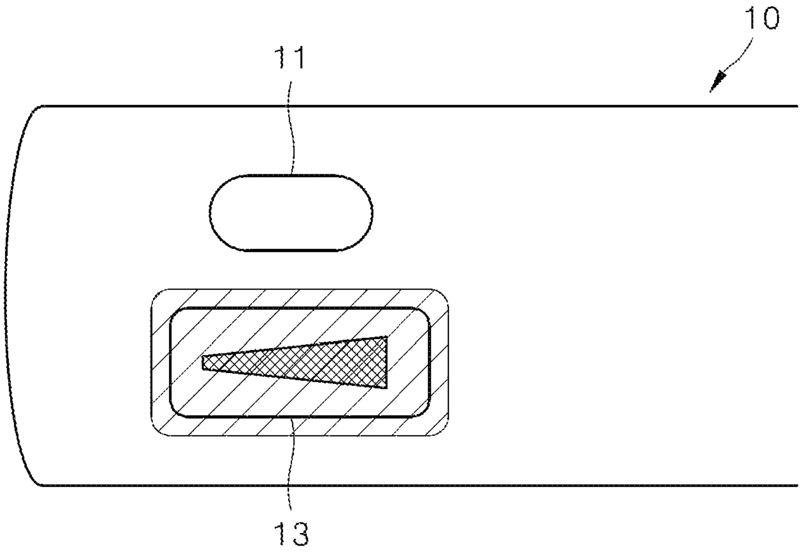
[FIG. 4B]
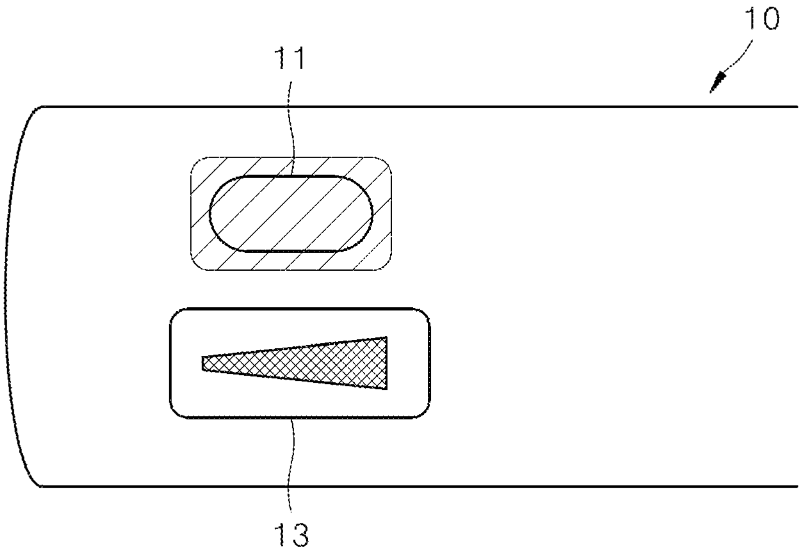

[FIG. 5A]
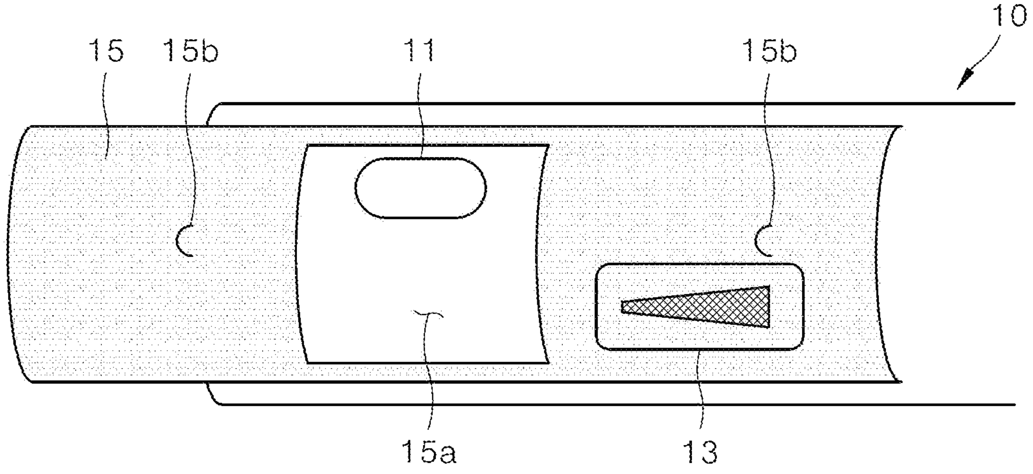
[FIG. 5B]
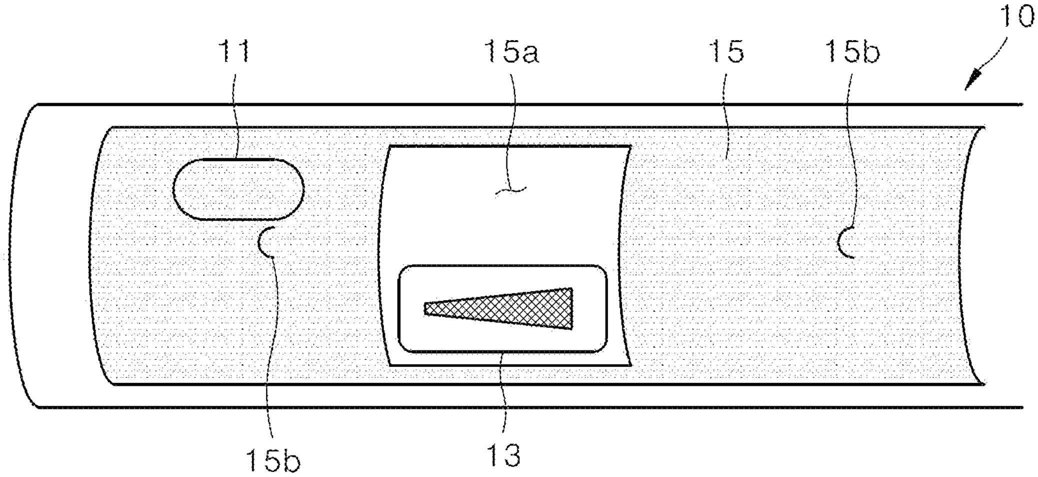

[FIG. 6]
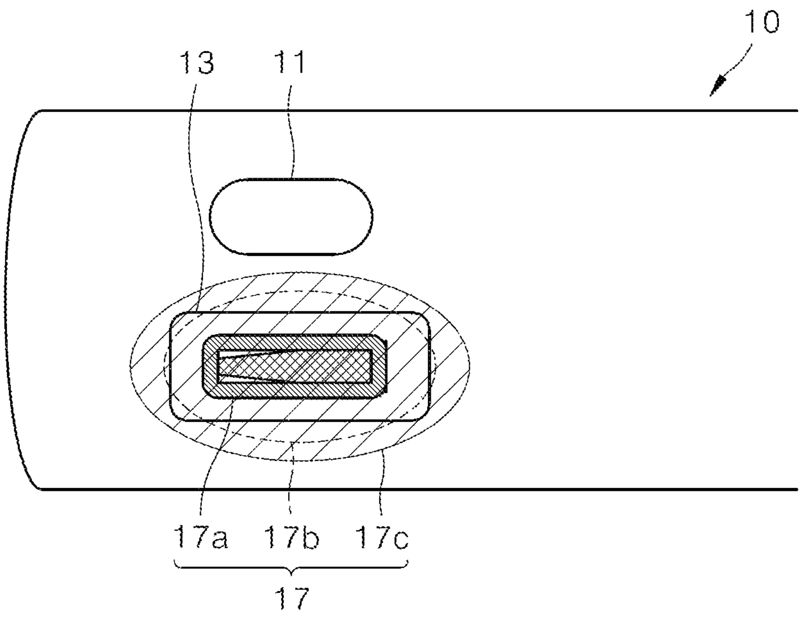

[FIG. 7]
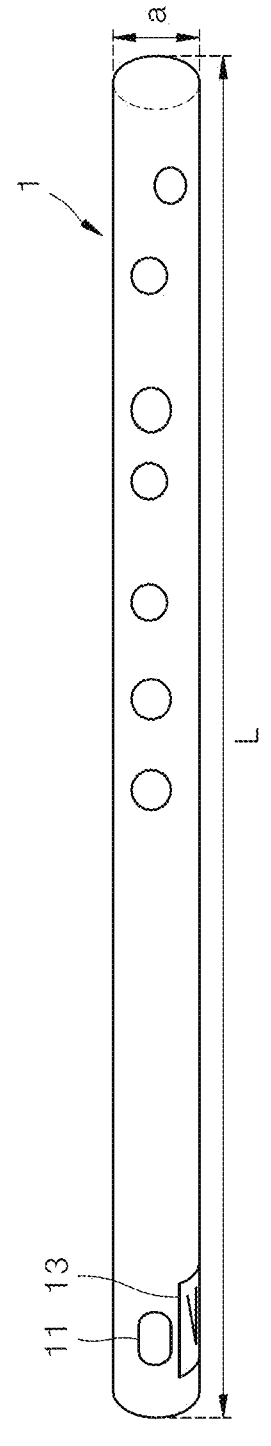

HEAD JOINT FOR WIND INSTRUMENT, HAVING MOUTHPIECE AND REED PORTION FORMED THEREON, AND WIND INSTRUMENT COMPRISING SAME

CROSS-REFERENCE TO RELATED APPLICATIONS

This application is a U.S. National Phase Patent Application under 35 U.S.C. § 371 of International Application No. PCT/KR2021/001253, filed on Jan. 29, 2021, which claims priority to Korean Patent Application No. 10-2020-0040187 filed on Apr. 2, 2020, the contents of which are incorporated by reference in their entireties.

TECHNICAL FIELD

The present disclosure relates to a head joint having a blow hole and a reed part for a wind instrument, and a wind instrument including the head joint. In particular, the present disclosure relates to a head joint having a blow hole and a reed part for a wind instrument, the head joint expanding a musical range that is one octave lower than the musical range of a both side open-type wind instrument, that is, bass by adding the musical range of a one side open-type wind instrument, which is played through a reed part, to the musical range of a both side open-type wind instrument having only a blow hole, and a wind instrument including the head joint.

BACKGROUND ART

Wind instruments may be classified into a both side open-type wind instrument and a one side open-type wind instrument.

Vertical flutes such as a recorder or a Danso and transverse flutes such as a fife, a flute, a Sogeum, and a Daegeum are included in both side open-type wind instruments.

As one side open-type wind instruments, there are brass instruments that a user plays by vibrating them with lips on them, a clarinet and a saxophone having one reed, an oboe and a Piri of Korean traditional musical instruments, which have a double reed, etc.

The length of the tubes of such wind instruments is very larger than the diameter of the tubes, which is for making a structure of which the resonance frequency is usually determined by the length of the tubes and is not greatly influenced by the thickness of the tubes.

The resonance frequency of wind instruments that is determined by the length of the tubes can be expressed as the following equation.

When the diameter of the tube of a both side open-type wind instrument is 'a', the length of the tube is the phase velocity of a sound wave is 'c', and a natural number is 'n', a resonance frequency is expressed as the following equation.

$$f_n = \frac{n}{2}\frac{c}{L + 0.8a}$$

It is a fundamental frequency when n is 1, and is second or higher harmonics when n is 2, 3, . . . .

FIG. 1A and FIG. 1B show the magnitude of wavelengths in a both side open-type wind instrument, in which FIG. 1A shows the standing wave of a fundamental that is a first harmonic and FIG. 1B shows the standing wave of a second partial that is a second harmonic.

The resonance frequency of both side open-type wind instruments is a multiple of a natural number such as one time, two times, three times, . . . of the fundamental.

That is, both side open-type wind instruments generate tones of which the half wavelength of the fundamental is slightly larger than the length of the tubes, and the wavelength of the partials decreases to ½, ⅓, ¼, etc. of the half wavelength of the fundamental, so tones having two-times, three-times, four-times frequencies are generated.

Accordingly, transverse flutes can generate a fundamental that is a first octave tone and can generate a second partial that is a second octave tone, a fourth partial that is a third octave tone, etc. by appropriately adjusting the direction and speed of wind that is blown into the blow hole.

On the other hand, the resonance frequency $f_n$ of one side open-type wind instruments of which the tubes are blocked on one side is expressed as the following equation.

$$f_n = \frac{2n-1}{4}\frac{c}{L + 0.4a}$$

It is a fundamental frequency when n is 1, and is second or higher harmonics when n is 2, 3, . . . .

FIG. 2A and FIG. 2B show the magnitude of wavelengths in a one side open-type wind instrument, in which FIG. 2A shows the standing wave of a fundamental that is a first harmonic and FIG. 2B shows the standing wave of a third partial that is a second harmonic.

The resonance frequency of both side open-type wind instruments is an odd multiple such as one time, three times, five times . . . of the fundamental.

That is, one side open-type wind instruments generate tones of which the ¼ wavelength of the fundamental is slightly larger than the length of the tubes, and the partials decrease to ⅓, ⅕, ⅐, etc. of the ¼ wavelength of the fundamental, so tones having three-times, five-times, seven-times frequencies are generated.

Accordingly, when playing with a reed, even though a fundamental is generated and then the speed, the air pressure, or the like of wind that is blown to the reed are appropriately adjusted, higher octave tones are not generated from the same tube length, so a tube larger than the length that generates a fundamental, additional holes, and fingering of keys are required to implement octave tones using partials.

Keys are employed in wind instruments when the number of holes is larger than the number of fingers or fingering is difficult because the intervals of holes are large.

Accordingly, when the tube lengths are the same, the fundamental of one side open-type wind instruments is one octave lower than the fundamental of both side open-type wind instruments.

Existing wind instruments have only a blow hole for blowing wind or is configured to attach only a reed.

Accordingly, such wind instruments have a structure that generates a fundamental and partials, as described above, by adjusting the amount, intensity, direction, pressure, etc. of wind through a blow hole or a reed.

Accordingly, both side open-type wind instruments that is played through a blow hole can implement two octave tones of a fundamental and a second partial when they have only finger holes that are supposed to be closed by fingers, and holes more than the number of fingers are additionally required to generate 3 or higher octave tones, so such both side open-type wind instruments are manufactured such that the holes can be closed or opened by keys that are structures made to be able to close or open additional holes and the holes using a pad, a spring, etc. rather than fingers.

When one side open-type wind instruments that is supposed to be played through a reed have only finger holes, they can implement only one octave tone that is a fundamental, and are manufactured to be able to implement two octaves using a partial by installing keys and forming additional holes and to be able to three or more octaves using partials by installing more complicated keys.

Further, both side open-type wind instruments can generate a first octave tone that is a fundamental and a second octave tone that is a second partial through almost the same fingering, and generate a third octave that is a fourth partial through slight different fingering.

However, in one side open-type wind instruments, fingering for a second octave tone and a third octave tone using partials is generally different from fingering for a fundamental.

Meanwhile, as reeds, there are a single reed that is used for a clarinet or a saxophone, a double reed that is used for an oboe or Piri that is Korean traditional musical instrument, a free reed that is used for a harmonica, etc.

A single reed is attached in use to a structure called a mouthpiece that is fitted to the size of the reed, and a double reed is folded half into a folded reed and inserted with the end portions tied in a corresponding tube in use.

A free reed is used through a structure formed to fix the reed to a support plate having holes slightly larger than the size of the reeds and to be able to vibrate the reed between the holes.

DOCUMENTS OF RELATED ART

Patent Document

KR 10-0961435 B1 (published on 2010 Jun. 9)

DISCLOSURE

Technical Problem

An objective of the present disclosure relates is to provide a head joint having a blow hole and a reed part for a wind instrument, the head joint expanding a musical range that is one octave lower than the musical range of a both side open-type wind instrument, that is, bass by adding the musical range of a one side open-type wind instrument, which is played through a reed part, to the musical range of a both side open-type wind instrument having only a blow hole, and a wind instrument including the head joint.

Technical Solution

A head joint having a blow hole and a reed part for a wind instrument of the present disclosure for achieving the objectives is a head joint formed in a tube shape with one closed end for a wind instrument, in which a blow hole and a reed part are spaced apart from each other at a predetermined distance from the closed end.

Further, a center of the blow hole and a center of the reed part may be positioned at the same distance from the closed end, and the blow hole and the reed part may be positioned to be spaced apart from each other in a circumferential direction of the head joint.

In this case, the blow hole and the reed part are spaced apart from each other such that it is possible to close the reed part with a portion of a face between a lower lip and a jaw when playing through the blow hole and it is possible to close the blow hole with a portion between an upper lip and a nose when playing through the reed part.

Alternatively, the blow hole and the reed part may be spaced apart from each other in a longitudinal direction of the head joint.

Further, a cover that can longitudinally or circumferentially slide is disposed on an outer circumferential surface of the head joint, and it is preferable that the cover is configured to block the reed part when playing through the blow hole and to block the blow hole when playing through the reed part.

In this case, a through-hole is formed at the cover, and the blow hole or the reed part is opened through the through-hole.

Further, one or more protrusions are formed at the cover and a user can slide the cover with his/her face in contact with the protrusion.

Further, the reed part is a free reed and a width of a fixing part that is fixed of the free reed is larger than a width of the opposite end.

When the length of the reed of the reed part is l and the acoustic tube length of a wind instrument is L, $0.04 \leq l^2/L < 0.11$ is satisfied.

Further, the reed part is a free reed and a protector formed in an elliptical ring shape is installed on the free reed, and it is preferable that a hole of the ring-shaped protector is positioned to communicate with the reed part.

In this case, a lower portion of the hole of the protector that comes in contact with the reed part is formed larger than the free reed and an upper portion is formed smaller than the free reed.

Meanwhile, a wind instrument of the present disclosure for achieving the objectives includes the head joint having a blow hole and a reed part for a wind instrument.

Details of other embodiments are included in "Best Mode for the Invention" and the accompanying "drawings".

The advantages and/or features of the present disclosure, and methods of achieving them will be clear by referring to the exemplary embodiments that will be describe hereafter in detail with reference to the accompanying drawings.

However, it should be noted that the present disclosure is not limited to the configuration of each of embodiments to be described hereafter and may be implemented in various ways, and the exemplary embodiments described in the specification are provided to complete the description of the present disclosure and let those skilled in the art completely know the scope of the present disclosure and the present disclosure is defined by claims.

Advantageous Effects

According to the present disclosure, both the blow hole 11 and the reed part are formed, so a wind instrument is operated as a both side open-type wind instrument by blocking the reed part when it is played through the blow hole, and the wind instrument is operated as a one side open-type wind instrument by blocking the blow hole when it is played through the reed part. Accordingly, the wind instrument generates low tones that are one octave lower than the musical range of both side open-type wind instruments that are played through the blow hole, whereby it is possible to implement a wind instrument having expanded low tones and generate a musical range expanded one octave from the existing both side open-type wind instruments.

Accordingly, there is an effect that it is possible to achieve the same musical range from a half of the tube length of existing both side open-type wind instruments and it is possible to easily implement a musical range of three octaves even from a wind instrument without keys.

DESCRIPTION OF DRAWINGS

FIG. 1A and FIG. 1B show the magnitude of wavelengths in a both side open-type wind instrument, in which FIG. 1A shows the standing wave of a fundamental that is a first harmonic and FIG. 2B shows the standing wave of a second partial that is a second harmonic.

FIG. 2A and FIG. 2B show the magnitude of wavelengths in a one side open-type wind instrument, in which FIG. 2A shows the standing wave of a fundamental that is a first harmonic and FIG. 2B shows the standing wave of a third partial that is a second harmonic.

FIG. 3 is a view showing a first embodiment of a head joint having a blow hole and a reed part for a wind instrument according to the present disclosure.

FIG. 4A is a view showing a region for blocking a reed part with diagonal solid lines and FIG. 4B is a view showing a region for blocking a blow hole with diagonal solid lines.

FIG. 5A and FIG. 5B are views showing a second embodiment of a head joint having a blow hole and a reed part for a wind instrument according to the present disclosure, in which FIG. 5A shows the state in which a reed part is covered with a cover and FIG. 5B shows the state in which a blow hole is covered with a cover.

FIG. 6 is a view showing a third embodiment of a head joint having a blow hole and a reed part for a wind instrument according to the present disclosure.

FIG. 7 is a view showing a wind instrument including a head joint having a blow hole and a reed part for a wind instrument according to the present disclosure.

BEST MODE FOR THE INVENTION

Hereafter, preferred embodiments of the present disclosure are described in detail with reference to the accompanying drawings.

Before describing the present disclosure in detail, terms or words used herein should not be construed as being limited to common or dictionary meanings, the concepts of various terms may be appropriately defined to the most optimally describe the invention by the inventor(s), and it should be noted that those terms or words should be construed as meanings and concepts corresponding to the technical spirit of the present disclosure.

That is, it should be noted that the terms used herein are used only to describing preferred embodiments of the present disclosure, not intending to limit the present disclosure in detail, and those terms are terms defined in consideration of various possibilities of the present disclosure.

Further, it should be noted that, in the specification, singular expression may include plural expression unless clearly stated in the sentences, and includes a singular meaning even if it is similarly expressed as a plural number.

It should be noted that when a component is described as "including" another component throughout the specification, the component may further include another component without another component excluded, unless specifically stated otherwise.

Further, it should be noted that when a component is described as "exists in" and "is connected to" another component, the component may be directly connected with another component, may be installed in contact with another component, or may be installed with a predetermined gap. When the component is installed with a gap, there may be a third component or means for fixing and connecting the component to another component, and the third component or means may not be described.

On the other hands, it should be understood that when a component is described as "directly connected" or "indirectly connected" to another component, it should be construed as there is no third component or means.

Similarly, the terms used herein to describe a relationship between elements, that is, "between", "directly between", "adjacent" or "directly adjacent" should be interpreted in the same manner as those described above.

Further, in the specification, it should be noted that terms such as "first side", "second side", "first", and "second", if used, are used to clearly discriminate one components from another component and the meaning of the corresponding component is not limited by the terms.

Further, terms related to positions such as "up", "down", "left", and "right", if used herein, should be construed as indicating relative positions of corresponding components in the corresponding figures and should not be construed as stating absolute positions unless the absolute positions of them are specified.

Further, it should be noted that, in the specification, terms such as "~part", "~er", "module", and "device", if used, mean a unit that can perform one or more functions or operations and may be implemented by hardware, software, or a combination of hardware and software.

Further, in the specification, when components are given reference numerals, the same reference numerals are given to same components even if they are shown in different figures, that is, same reference numerals indicate same components throughout the specification.

The size, position, coupling relationship, etc. of components of the present disclosure may be partially exaggerated or reduced in the accompanying drawings for the convenience of description in order to sufficiently and clearly transmit the spirit of the present disclosure, so the proportion or scale may not be precise.

Further, in the following description of the present disclosure, components that are determined to unclearly make the spirit of the present disclosure unclear, for example, well-known technology including the related art may not be described in detail.

FIG. 3 is a view showing a first embodiment of a head joint having a blow hole and a reed part for a wind instrument according to the present disclosure.

A head joint 10 having a blow hole 11 and a reed part 13 for a wind instrument according to the present disclosure is formed in a tube shape with one closed end, in which the blow hole 11 and the reed part 13 are spaced apart from each other at predetermined distances from the closed end.

The center of the blow hole 11 and the center of the reed part 13 are positioned at the same distance from the closed end, and the blow hole 11 and the reed part 13 are positioned to be spaced apart from each other in the circumferential direction of the head joint 10.

A wind instrument including the head joint 10 has both the blow hole 11 and the reed part 13, so it is operated as a both side open-type wind instrument by blocking the reed part 13 when it is played through the blow hole 11, and it is operated as a one side open-type wind instrument by blocking the blow hole 11 when it is played through the reed part 13. Accordingly, the wind instrument generates low tones that are one octave lower than the musical range of both side open-type wind instruments that are played through the blow hole 11, whereby it is possible to implement a wind instrument having expanded low tones and generate a musical range expanded one octave from the existing musical range.

When a sound is generated by blowing into a blow hole of a transverse flute of which one end of the tube is closed and that has a blow hole, it operates as a both side open-type wind instrument, tones of which the fundamentals are half wavelengths of the tube length are generated.

When a reed is attached and it is played through a reed part instead of the blow hole, it operates as a one side open-type wind instrument, so tones of which the fundamentals are ¼ wavelengths of the tube length are generated.

As described above, both the blow hole 11 and the reed part 13 are formed, the reed part 13 is blocked when an instrument is played through the blow hole 11, and the blow hole 11 is blocked when the instrument is played through the reed part 13, whereby a fundamental and a partial of a both side open-type wind instrument are generated through the blow hole 11 and a fundamental of a one side open-type wind instrument that is one octave lower than the fundamental of a both side open-type wind instrument is implemented through the reed part 13. Accordingly, it is possible to implement a wind instrument having expanded low tones by implementing low tones that are one octave lower than instruments having only a blow hole in the related.

Further, tones slightly over three octaves are implemented from an instrument that having only finger holes without keys and implements only tones slight over two octaves, and when the head joint 10 to which the present disclosure is applied is connected and used instead of the head joint of a piccolo or a flute that implements tones over three octaves, tones are expanded one octave lower than fundamental tones, so a wind instrument that implements tones over four octaves is achieved.

Meanwhile, the reed part 13 is a free reed and it is preferable that the width of a fixing part that is fixed of the free reed is larger than the width of the opposite end.

When the length of the reed of the reed part 13 is 1 and the acoustic tube length of a wind instrument is L, $0.04 \leq l^2/L < 0.11$ is satisfied.

FIG. 4A is a view showing a region for blocking a reed part with diagonal solid lines and FIG. 4B is a view showing a region for blocking a mouth with diagonal solid lines.

The blow hole 11 and the reed part 13 are spaced apart from each other in the circumferential direction of the head joint 10 so that a user can close the reed part 13 with the portion of the face between the lower lip and the jaw when playing through the blow hole 11 and a user can close the blow hole 11 with the portion between the upper lip and the nose when playing through the reed part 13.

FIG. 5A and FIG. 5B are views showing a second embodiment of a head joint for a wind instrument having a mouth part and a reed part according to the present disclosure, in which FIG. 5A shows the state in which a reed part is covered with a cover and FIG. 5B shows the state in which a mouth is covered with a cover.

The blow hole 11 and the reed part 13 may be spaced apart from each other in the longitudinal direction of the head joint 10.

In this case, a cover 15 that can longitudinally slide is disposed on the outer circumferential surface of the head joint 10. The cover 15 is configured to block the reed part 13 when playing through the blow hole 11 and to block the blow hole 11 when playing through the reed part 13.

Further, the cover may be provided to be able to slide in the circumferential direction of the head joint.

The technique of providing the cover 15 to be slidable on the outer circumferential surface of the head joint 10 is well known in the art, so it is not described in detail.

For example, this configuration may be implemented by forming a sliding protrusion and a sliding groove.

A through-hole 15*a* is formed at the cover 15, and the blow hole 11 or the reed part 13 is opened through the through-hole 15*a*.

Further, one or more protrusions 15*b* are formed at the cover 15, and it is preferable that protrusions are formed in a pair at both sides of the through-hole 15*a*.

A user can open the blow hole 11 or the reed part 13 to the outside by sliding the cover 15 with his/her face in contact with the protrusion 15*b* such that the through-hole 15*a* is positioned over the blow hole 11 or the reed part 13.

FIG. 6 is a view showing a third embodiment of a head joint for a wind instrument having a mouth part and a reed part according to the present disclosure.

The reed part 13 is a free reed and a protector 17 formed in an elliptical ring shape is installed on the free reed at the reed part 13 to protect the free reed and make playing easy.

In this case, it is preferable that a hole of the ring-shaped protector 17 is positioned to communicate with the reed part 13.

A lower portion (an inner edge line of the bottom 17*b* and an outer edge line of the bottom 17*c*) of the hole of the protector 17 that comes in contact with the reed part 13 is formed larger than the free reed and the upper portion 17*a* is formed smaller than the free reed.

A hole larger or smaller than the length or width of a free reed is formed to be fitted to the size of the lips of a user by installing the protector 17 and adjusting the sizes of the upper and lower holes of the protector 17, whereby it is possible to easily play through the reed part 13 and easily block the reed part 13 when playing with the blow hole 11.

Meanwhile, when the head joint 10 described above is manufactured to the tube thickness of a flute or a piccolo that are existing wind instruments and then connected to the wind instruments, it is possible to implement expanded tones that are one octave lower than the first octave tones in an existing musical range.

FIG. 7 is a view showing a wind instrument including a head joint for a wind instrument having a blow hole and a reed part according to the present disclosure.

A wind instrument 1 according to the present disclosure is characterized by including the head joint 10 having a blow hole 11 and a reed part 13 for a wind instrument described above.

A both side open-type wind instrument was manufactured such that the tube length L was 31.1 cm and the tube diameter D was about 18 cm, and in this case, a musical range that could be easily made by playing the instrument through the blow hole was C5 (523 Hz)~E7(2637 Hz), which corresponds to two octaves and two tones, and C4 (262 Hz)~B4(494 Hz) was possible when playing through the reed part.

That is, an instrument that implements two octaves and two tones within from C5 to E7 when there is no reed part became an instrument that implements three octaves and two tones from C4 to E7.

That is, the musical range of a soprano flute of which the acoustic tube length is about 60 cm could by implemented as a wind instrument of which the acoustic tube length is about 30 cm.

In this case, the fundamental frequency of a reed is also important, and a free reed having a fundamental frequency higher than the frequency of the highest tone that is generated when a wind instrument is played through a reed part was used, the musical range of the wind instrument was generated well.

That is, when a free reed that generates a tone over C5 (523 Hz) as a fundamental frequency was formed and attached, high tones were easily generated from C4 (263 Hz) at the tube length of a sample.

A free reed is a reed that vibrates with a side fixed and the resonance frequency thereof is expressed as the following equation.

$$f_n = \frac{\pi c \kappa}{8L^2}(1.194^2, 2.988^2, 5^2, 7^2, \dots)$$

κ is a number corresponding to a radius of gyration when a reed bends, the number in the parentheses are constants that are multiplied for a fundamental, a second harmonic, a third harmonic, . . . .

That is, the resonance frequency is inversely proportion to a square of the length of a reed.

The reed length of the sample was about 14 mm.

A head joint having a mouth part and a reed part for a wind instrument according to the present disclosure and a wind instrument including the head joint were described by exemplifying a wind instrument such as a transverse flute, but can be applied to wind instruments such as a vertical flute too.

Various preferred embodiments of the present disclosure were described above through some examples, but the various embodiments described in "Best Mode for the Invention" are only examples and it would be clearly understood by those skilled in the art the present disclosure may be changed in various ways or equivalently implemented from the above description.

Further, it should be noted that since the present disclosure may be implemented in other various ways, the present disclosure is not limited to the above description, the above description is provided to completely explain the present disclosure and provided only to completely inform those skilled in the art of the range of the present disclosure, and the present disclosure is defined by only claims.

EXPLANATION OF REFERENCE NUMERALS

1 wind instrument
10 head joint
11 blow hole
13 reed part
15 cover
15*a* through-hole
15*b* protrusion(s)
17 protector
17*a* upper portion
17*b* inner edge line of the bottom
17*c* outer edge line of the bottom

The invention claimed is:

1. A head joint formed in a tube shape with one closed end for a wind instrument, wherein both a blow hole and a reed part are spaced apart from each other at a predetermined distance from the closed end, and wherein a center of the blow hole and a center of the reed part are positioned at the same distance from the closed end, and the blow hole and the reed part are positioned to be spaced apart from each other in a circumferential direction of the head joint.

2. The head joint of claim 1, wherein the blow hole and the reed part are spaced apart from each other such that it is possible to close the reed part with a portion of a face between a lower lip and a jaw when playing through the blow hole and it is possible to close the blow hole with a portion between an upper lip and a nose when playing through the reed part.

3. A head joint formed in a tube shape with one closed end for a wind instrument, wherein both a blow hole and a reed part are spaced apart from each other at a predetermined distance from the closed end, and wherein the blow hole and the reed part are spaced apart from each other in a longitudinal direction of the head joint.

4. The head joint of claim 1, wherein a cover that can longitudinally or circumferentially slide is disposed on an outer circumferential surface of the head joint, and the cover is configured to block the reed part when playing through the blow hole and to block the blow hole when playing through the reed part.

5. The head joint of claim 4, wherein a through-hole is formed at the cover, and the blow hole or the reed part is opened through the through-hole.

6. The head joint of claim 5, wherein one or more protrusions are formed at the cover and a user can slide the cover with his/her face in contact with the protrusion.

7. The head joint of claim 1, wherein the reed part is a free reed and a width of a fixing part that is fixed of the free reed is larger than a width of the opposite end.

8. The head joint of claim 1, wherein when a length of a reed of the reed part is l and an acoustic tube length of a wind instrument is L, $0.04 \le l^2/L < 0.11$ is satisfied.

9. The head joint of claim 1, wherein the reed part is a free reed and a protector formed in an elliptical ring shape is installed on the free reed, and a hole of the ring-shaped protector is positioned to communicate with the reed part.

10. The head joint of claim 9, wherein a lower portion of the hole of the protector that comes in contact with the reed part is formed larger than the free reed and an upper portion is formed smaller than the free reed.

11. A wind instrument including the head joint having a blow hole and a reed part for a wind instrument of claim 1.

12. The head joint of claim 3, wherein a cover that can longitudinally or circumferentially slide is disposed on an outer circumferential surface of the head joint, and the cover is configured to block the reed part when playing through the blow hole and to block the blow hole when playing through the reed part.

13. The head joint of claim 3, wherein the reed part is a free reed and a width of a fixing part that is fixed of the free reed is larger than a width of the opposite end.

14. The head joint of claim 3, wherein when a length of a reed of the reed part is l and an acoustic tube length of a wind instrument is L, $0.04 \le l^2/L < 0.11$ is satisfied.

15. The head joint of claim 3, wherein the reed part is a free reed and a protector formed in an elliptical ring shape is installed on the free reed, and a hole of the ring-shaped protector is positioned to communicate with the reed part.

16. A wind instrument including the head joint having a blow hole and a reed part for a wind instrument of claim 3.

* * * * *